(12) United States Patent
Jolly et al.

(10) Patent No.: US 7,764,838 B2
(45) Date of Patent: Jul. 27, 2010

(54) SYSTEM AND METHOD FOR EXTRACTING AN OBJECT OF INTEREST FROM AN IMAGE USING A ROBUST ACTIVE SHAPE MODEL

(75) Inventors: Marie-Pierre Jolly, Hillsborough, NJ (US); Julien Abi-Nahed, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 993 days.

(21) Appl. No.: 11/222,092

(22) Filed: Sep. 8, 2005

(65) Prior Publication Data

US 2006/0056698 A1 Mar. 16, 2006

Related U.S. Application Data

(60) Provisional application No. 60/609,742, filed on Sep. 14, 2004.

(51) Int. Cl.
*G06K 9/66* (2006.01)
(52) U.S. Cl. .................. 382/190; 382/128; 382/173; 382/181; 382/201; 382/203
(58) Field of Classification Search ............. 382/128, 382/132, 154, 190
See application file for complete search history.

(56) References Cited

U.S. PATENT DOCUMENTS

| | | | | |
|---|---|---|---|---|
| 5,987,094 A | * | 11/1999 | Clarke et al. ............. | 378/62 |
| 6,106,466 A | * | 8/2000 | Sheehan et al. ............. | 600/443 |
| 6,289,135 B1 | * | 9/2001 | Declerck et al. ............. | 382/276 |
| 7,590,264 B2 | * | 9/2009 | Mattes et al. ............. | 382/107 |
| 2001/0031920 A1 | * | 10/2001 | Kaufman et al. ............. | 600/431 |
| 2006/0250386 A1 | * | 11/2006 | Movassaghi et al. ............. | 345/419 |

OTHER PUBLICATIONS

Nicolae Duta and Milan Sonka, "Segmentation and Interpretation of MR Brain Images: An Improved Active Shape Model" IEEE Transactions on Medical Imaging, vol. 17, No. 6, Dec. 1998, pp. 1049-1062.*

Nicolae Duta and Milan Sonka, "Segmentation and Interpretation of MR Brain Images Using an Improved Knowledge-Based Active Shape Model" Proceedings of the 15th International Conference on Information Processing in Medical Imaging, vol. 1230, 1997, pp. 375-380.*

Nicolae Duta, Anil K. Jain and Marie-Pierre Dubuisson-Jolly, "Automatic Construction of 2D Shape Models" IEEE Transactions on Pattern Analysis and Machine Intelligence, vol. 23, No. 5, May 2001, pp. 433-446.*

* cited by examiner

*Primary Examiner*—Bhavesh M Mehta
*Assistant Examiner*—Eric Rush
(74) *Attorney, Agent, or Firm*—Donald B. Paschburg; F. Chau & Associates, LLC (57) ABSTRACT

A system and method for extracting an object of interest from an image using a robust active shape model are provided. A method for extracting an object of interest from an image comprises: generating an active shape model of the object; extracting feature points from the image; and determining an affine transformation and shape parameters of the active shape model to minimize an energy function of a distance between a transformed and deformed model of the object and the feature points.

20 Claims, 9 Drawing Sheets

SYSTEM AND METHOD FOR EXTRACTING AN OBJECT OF INTEREST FROM AN IMAGE USING A ROBUST ACTIVE SHAPE MODEL

CROSS-REFERENCE TO RELATED APPLICATION

This application claims the benefit of U.S. Provisional Application No. 60/609,742, filed Sep. 14, 2004, a copy of which is herein incorporated by reference.

BACKGROUND OF THE INVENTION

1. Technical Field

The present invention relates to image processing, and more particularly, to a system and method for extracting an object of interest from an image using a robust active shape model.

2. Discussion of the Related Art

An active shape model represents a parametric deformable model where a statistical model of a global shape variation from a training set is to be built. This model is used to fit another model to unseen occurrences of an object earlier annotated in the training set. To accomplish this, a model of a shape of interest is learned by collecting a set of training examples and aligning them in a rigid fashion using pre-defined landmark points corresponding to the shape. Once the shapes have been aligned, a principal component analysis is used to determine the principal modes of variation in addition to the mean average shape. The resulting model may then be used for segmentation.

For example, given a new image, the shapes can be localized by undergoing an iterative segmentation process for locating quality feature points. However, at each iteration, the decision for locating quality feature points is made based on a local search in a direction perpendicular to the model. Although this may be acceptable in a clean image, it is susceptible to break down when an image is very noisy or the boundary of an object is poorly defined.

One of the basic building blocks in any point-based registration scheme involves matching feature points that are extracted from a sensed image to their counterparts in a reference image. Given two sets of points, the goal is to determine the affine transformation that transforms one point set so that its distance from the other point set is minimized. One technique for determining the affine transformation is known as robust point matching.

Robust point matching involves aligning two arbitrary sets of points by establishing a geometric mapping that superimposes the two sets of points in the same reference frame and rejects outliers. Although, robust point matching is capable of establishing a large number of correspondences between two sets of points while rejecting outliers, there is no constraint introduced to limit the amount of deformations. Accordingly, there is a need for a technique of matching two sets of points while limiting the amount of deformations to constrain the deformed set to belong to a class of desired objects.

SUMMARY OF THE INVENTION

The present invention overcomes the foregoing and other problems encountered in the known teachings by providing a system and method for extracting an object of interest from an image using a robust active shape model.

In one embodiment of the present invention, a method for extracting an object of interest from an image comprises: generating an active shape model of the object; extracting feature points from the image; and determining an affine transformation and shape parameters of the active shape model to minimize an energy function of a distance between a transformed and deformed model of the object and the feature points. The feature points are manually extracted. The feature points are automatically extracted.

Determining an affine transformation and shape parameters of the active shape model comprises: determining an initial temperature and a final temperature; setting a first temperature to the initial temperature; initializing the affine transformation and shape parameters; and executing a robust point matching algorithm until the first temperature is less than the final temperature.

Executing a robust point matching algorithm comprises: determining a transformed model of the active shape model; determining a match matrix; performing a double normalization of the match matrix; generating estimated data to map the feature points to the active shape model and the transformed active shape model; solving the affine transformation if the first temperature is greater than the initial temperature or the affine transformation and the shape parameters if the first temperature is less than the initial temperature; and decreasing the first temperature.

The image is acquired using one of a magnetic resonance (MR), computed tomography (CT), positron emission tomography (PET), a two-dimensional (2D) or three-dimensional (3D) fluoroscopic, a 2D, 3D, or four-dimensional (4D) ultrasound, or x-ray imaging technique.

In another embodiment of the present invention, a system for extracting an object of interest from an image comprises: a memory device for storing a program; a processor in communication with the memory device, the processor operative with the program to: generate an active shape model of the object; extract feature points from the image; and determine an affine transformation and shape parameters of the active shape model to minimize an energy function of a distance between a transformed and deformed model of the object and the feature points.

The extraction of feature points may be performed in response to a manual input. The extraction of feature points may be performed automatically. The image is acquired using one of an MR, CT, PET, a 2D or 3D fluoroscopic, a 2D, 3D, or 4D ultrasound, or x-ray imaging device.

When determining an affine transformation and shape parameters of the active shape model the processor is further operative with the program code to: determine an initial temperature and a final temperature; set a first temperature to the initial temperature; initialize the affine transformation and shape parameters; and execute a robust point matching algorithm until the first temperature is less than the final temperature.

When executing a robust point matching algorithm the processor is further operative with the program code to: determine a transformed model of the active shape model; determine a match matrix; perform a double normalization of the match matrix; generate estimated data to map the feature points to the active shape model and the transformed active shape model; solve the affine transformation if the first temperature is greater than the initial temperature or the affine transformation and the shape parameters if the first temperature is less than the initial temperature; and decrease the first temperature.

In yet another embodiment of the present invention, a method for extracting an object of interest from an image using a robust active shape model comprises: generating an active shape model of the object; acquiring the image; extracting feature points from the image; embedding the active shape model in a robust point matching algorithm to form the robust active shape model; and determining an affine transformation and shape parameters of the active shape model to minimize an energy function of a distance between a transformed and deformed model of the object and the feature points by iterating the robust active shape model until a first temperature is smaller than a final temperature.

The active shape model includes an average contour model and modes of variations. The feature points are manually extracted. The feature points are automatically extracted. The image is acquired using one of an MR, CT, PET, a 2D or 3D fluoroscopic, a 2D, 3D, or 4D ultrasound, or x-ray imaging technique. The method further comprises outputting the object of interest.

Determining an affine transformation and shape parameters of the active shape model comprises: determining an initial temperature and a final temperature for annealing; setting a first temperature to the initial temperature; and initializing the affine transformation and shape parameters.

Iterating the robust active shape model comprises: determining a transformed model of the active shape model; determining a match matrix; performing a double normalization of the match matrix; generating estimated data to map the feature points to the active shape model and the transformed active shape model; solving the affine transformation if the first temperature is greater than the initial temperature or the affine transformation and the shape parameters if the first temperature is less than the initial temperature; and decreasing the first temperature.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
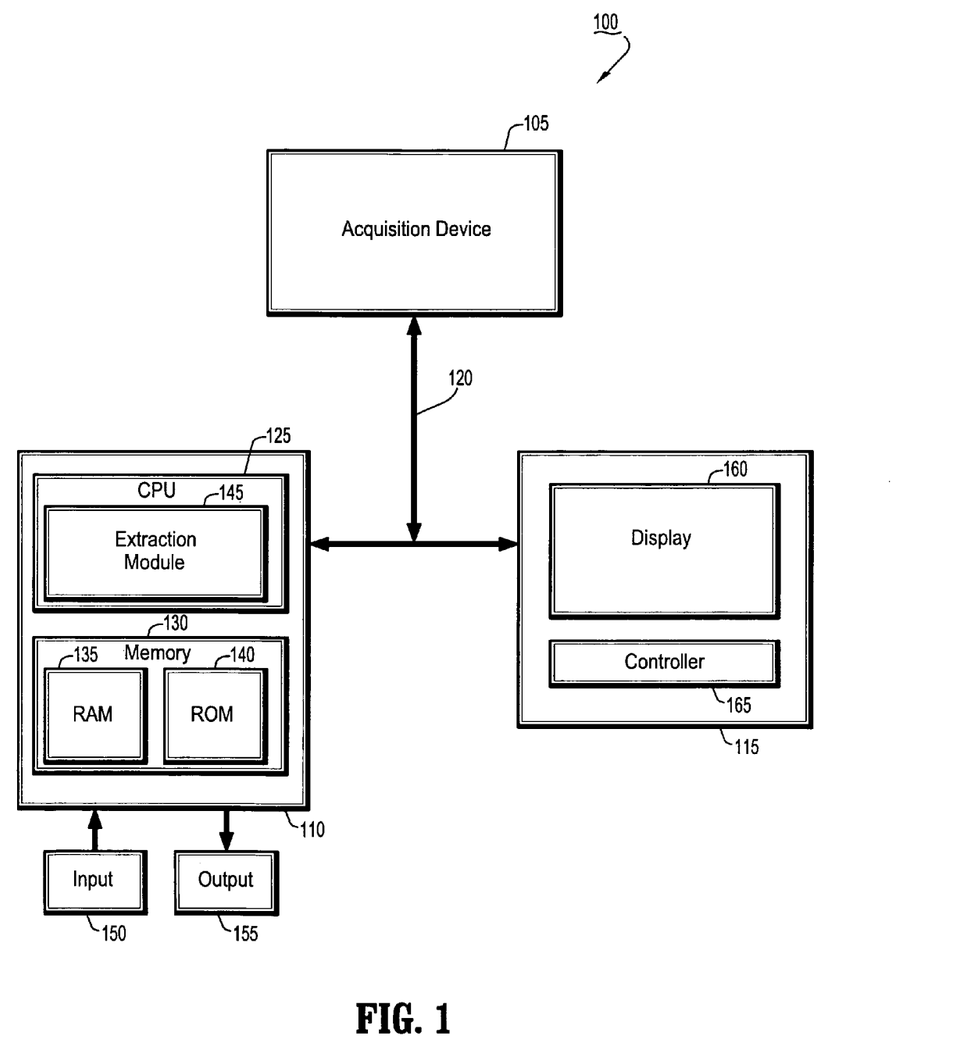
FIG. 1 is a block diagram of a system for extracting an object of interest from an image according to an exemplary embodiment of the present invention.

FIG. 1 is a block diagram of a system 100 for extracting an object of interest from an image using a robust active shape model according to an exemplary embodiment of the present invention.

As shown in FIG. 1, the system 100 includes, inter alia, an acquisition device 105, a personal computer (PC) 110 and an operator's console 115 connected over, for example, an Ethernet network 120. The acquisition device 105 may be a magnetic resonance (MR) imaging device, a computed-tomography (CT) imaging device, a helical CT device, a positron emission tomography (PET) device, a two-dimensional (2D) or three-dimensional (3D) fluoroscopic imaging device, a 2D, 3D, or four-dimensional (4D) ultrasound imaging device, or an x-ray device.

The acquisition device 105 may also be a hybrid-imaging device capable of CT, MR, PET or other imaging techniques. The acquisition device 105 may further be a flatbed scanner that takes in an optical image and digitizes it into an electronic image represented as binary data to create a computerized version of a photo or illustration.

The PC 110, which may be a workstation, portable or laptop computer, a personal digital assistant (PDA), etc., includes a central processing unit (CPU) 125 and a memory 130, which are connected to an input 150 and an output 155. The CPU 125 includes an extraction module 145 that includes one or more methods for extracting an object of interest from an image using a robust active shape model according to an exemplary embodiment of the present invention.

The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, or printer.

The operation of the system 100 is controlled from the operator's console 115, which includes a controller 165, for example, a keyboard, and a display 160, for example, a CRT display. The operator's console 115 communicates with the PC 110 and the acquisition device 105 so that 2D image data collected by the acquisition device 105 can be rendered into 3D data by the PC 110 and viewed on the display 160. It is to be understood that the PC 110 can be configured to operate and display information provided by the acquisition device 105 absent the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices. The PC 110 may also include an image rendering system/tool/application for processing digital image data of an acquired image dataset to generate and display 2D and/or 3D images.

As shown in FIG. 1, the extraction module 145 may also be used by the PC 110 to receive and process digital medical image data, which as noted above, may be in the form of raw image data, 2D reconstructed data (e.g., axial slices), or 3D reconstructed data such as volumetric image data or multi-planar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

Before describing a method of extracting an object of interest from an image using a robust active shape model according to an exemplary embodiment of the present invention, an active shape model and a robust point matching algorithm will be described.

As previously discussed, an active shape model aligns shapes without defining landmark points. Once the shapes have been aligned, a principle component analysis is used to determine principal modes of variation in addition to the mean (e.g., average) shape.

A shape is then defined by:

$$x = T(\bar{x} + \Phi b)$$

where $\bar{x}$ is the average shape, $\Phi$ are the modes of variation, b are coefficients of the modes of variation or shape parameters, and T is an affine transformation.

Given a new image, the shape can be localized in the following way. First, the average shape is placed with an arbitrary position, scale and orientation in the image. Then, for each model point, the system searches for the best feature point on a line perpendicular to the model. The model then aligns itself with the feature points by determining the affine transformation T and the shape parameters b. The process is iterated to find new and better feature points for each new pose and shape parameters of an object being segmented.

This is done by using, for example, the following process: 1) initializing the shape parameters b to zero; 2) generating the model instance $x=\bar{x}+\Phi b$; 3) locating the pose parameters (e.g., the affine transformation) which best map the shape x to the feature points Y (e.g., using least squares); 4) inverting the pose parameters to project Y into the model coordinate space $y=T^{-1}(Y)$; 5) updating the model parameters $b=b+\Phi^T(y-x)$; 6) applying constraints on b; and 7) returning to (2) for a fixed number of iterations or until a convergence occurs.

As previously discussed, a robust point matching algorithm is used to align two sets of points. For example, a first set of points $\{X_i, i=1, \ldots, N\}$ and a second set of points $\{Y_j, j=1, \ldots, K\}$. As the number of points in each set does not have to be equal, the algorithm identifies outliers in both sets. The algorithm maintains a matrix M of size $(N+1) \times (K+1)$ to store both the correspondences and the outliers as follows:

$$M_{ij} = \begin{cases} 1 & \text{if point } X_i \text{ corresponds to point } Y_j \\ 0 & \text{otherwise} \end{cases}$$

$$M_{i(K+1)} = \begin{cases} 1 & \text{if point } X_i \text{ is an outlier} \\ 0 & \text{otherwise} \end{cases}$$

-continued $$M_{(N+1)j} = \begin{cases} 1 & \text{if point } Y_j \text{ is an outlier} \\ 0 & \text{otherwise} \end{cases}$$

The goal of the algorithm is to minimize the following cost function:

$$E(M, T) = \sum_{i=1}^{N} \sum_{j=1}^{K} M_{ij} \|X_i - A(Y_j)\|^2 - \lambda \sum_{i=1}^{N} \sum_{j=1}^{K} M_{ij} + T \sum_{i=1}^{N} \sum_{j=1}^{K} M_{ij} \log M_{ij}$$

where T is a temperature parameter used for deterministic annealing. The first term corresponds to the geometrical alignment of the two sets (e.g., using an affine transformation A). The second term prevents the recovery of the trivial solution where all correspondences, $M_{ij}$, are null. The third term is a deterministic annealing term to enforce the constraints of:

$$\sum_{j=1}^{K+1} M_{ij} = 1 \; \forall \; i = 1, \ldots, N+1 \text{ and } \sum_{i=1}^{N+1} M_{ij} = 1 \; \forall \; j = 1, \ldots, K+1.$$

The above minimization task is solved using deterministic annealing where the $M_{ij}$ take values between 0 and 1. As the temperature T is decreased, the correspondences harden to get closer to the binary values 0 and 1. This point pattern matching technique is also known as softassign. The softassign technique is performed by: 1) initializing the affine transformation A to superpose the centers of mass of the two sets of points and setting a temperature T to $T_0$; 2) evaluating the correspondences, $$M_{ij} = \exp\left\{-\frac{\|X_i - A(Y_j)\|^2 - \lambda}{T}\right\};$$

3) performing a double the normalization of the matrix M to enforce the constraints; 4) applying the correspondence matrix to the point set $Y_j$ to generate the new set $Y_j'$ with N points; 5) determining the affine transformation (e.g., using least squares); 6) reducing the temperature; and 7) returning to (2) until T reaches $T_f$.

Now that the active shape model and robust point matching algorithm have been described, the method for extracting an object of interest from an image using a robust active shape model according to an exemplary embodiment of the present invention will be described with reference to FIGS. 2-9.

Figure 2:
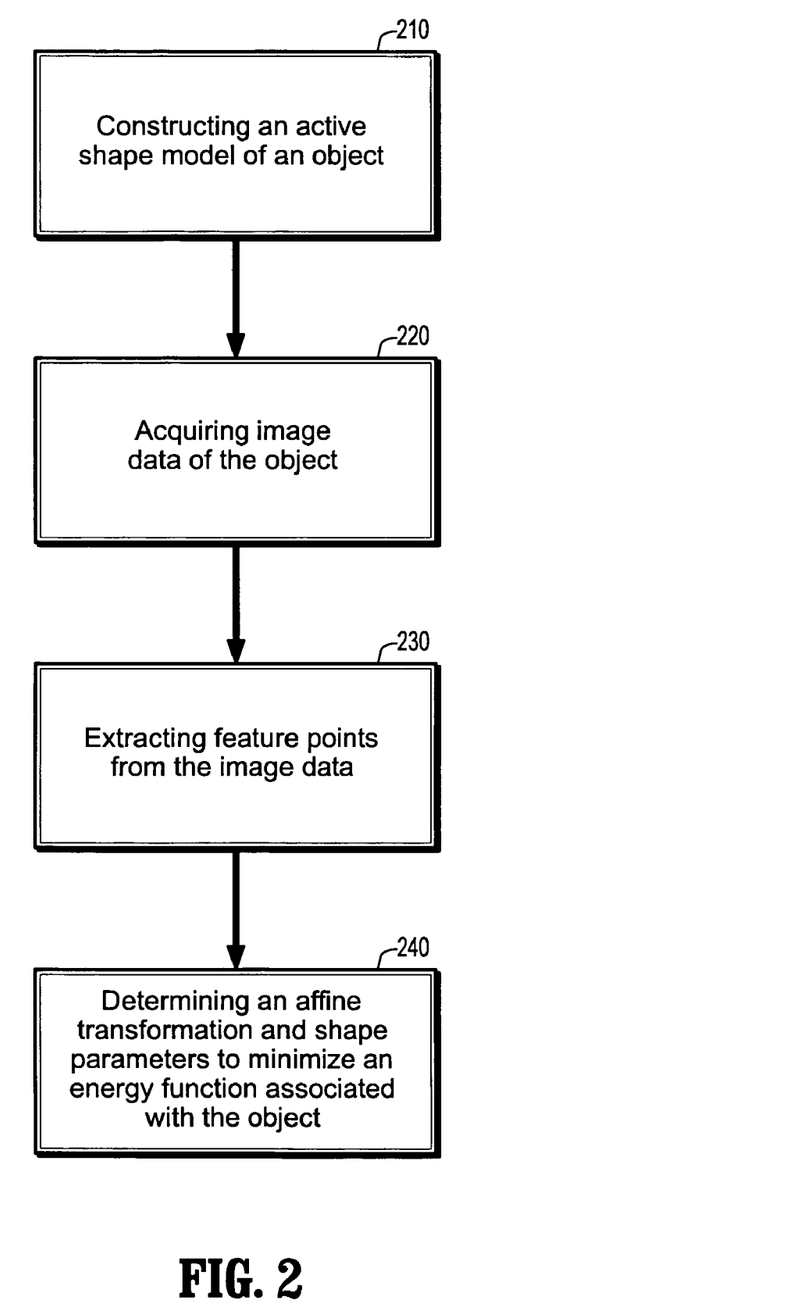
FIG. 2 is a flowchart illustrating a method for extracting an object of interest from an image according to an exemplary embodiment of the present invention.

As shown in FIG. 2, using a number of examples of an object of interest, an active shape model including an average contour model and modes of variations is generated (210). The active shape model may include an average shape defined by: $\bar{Y}=\{\bar{Y}_i, i=1, \ldots, K\}$, with a set of K points in 2D, modes of variation defined by:

$$P = \begin{bmatrix} P_{11} & \cdots & P_{1K} \\ \vdots & & \vdots \\ P_{B1} & \cdots & P_{BK} \end{bmatrix},$$

with B modes of variation, each with K coefficients in 2D; and a new shape to be computed as: $Y=\overline{Y}+bP$, where b is the vector of B shape parameters.

After the active shape model has been generated, image data of the object of interest is acquired (220). The image data may be, for example, that of a pulmonary vessel tree acquired from a pair of lungs inside a patient. The image data may be acquired by using the acquisition device 105, in this example a CT scanner, which is operated at the operator's console 115, to scan the patient's chest or lungs thereby generating a series of 2D image slices associated with the lungs. The 2D image slices of the lungs are then combined to form a 3D image of the pulmonary vessel tree.

In addition to the lungs, it is to be understood that the image data can be from any body organ of interest such as the heart or colon and can be acquired using a variety of medical imaging modalities such as those described above for the acquisition device 105. It should also be understood that the image data could be non-medical image data such as a vehicle or a tree and can be acquired, for example, by taking a photograph or by using a digital scanner.

Given the image data, feature points are extracted therefrom using a feature detection algorithm (230). The feature points may be identified as: $X=\{X_j, j=1, \ldots, N\}$ having a set of N points in 2D. The feature points can be determined by using an edge detector where pixels with a high gradient magnitude in the image are highlighted. A corner detector could also be used. It is to be understood that the feature detector does not have to be general and therefore can be very specific to the application at hand.

Figure 3:
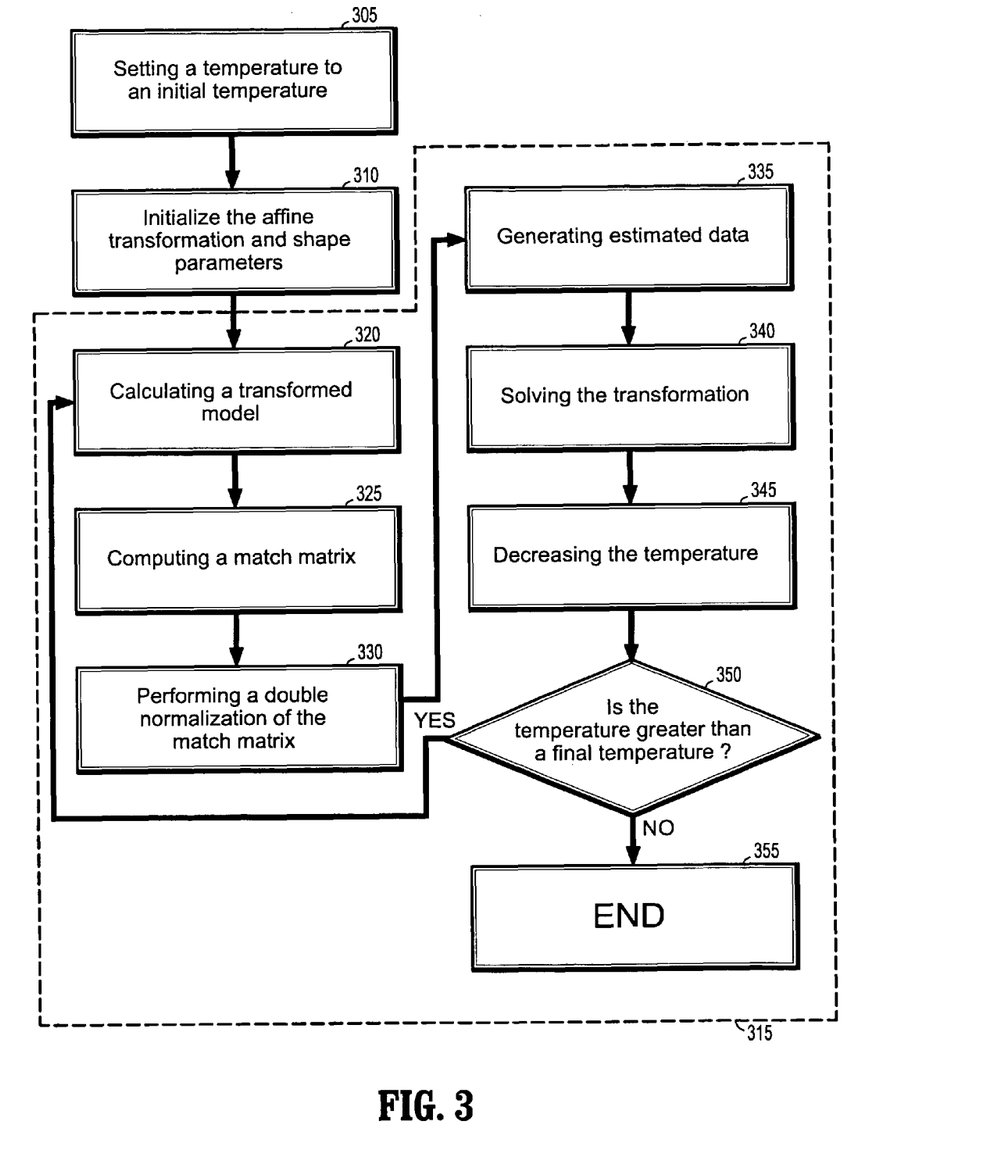
FIG. 3 is a flowchart illustrating a method for determining an affine transformation and shape parameters according to an exemplary embodiment of the present invention.

Using the feature points, the affine transformation A and the shape parameters b for minimizing the energy function:

$$E = \sum_{i=1}^{N}\sum_{j=1}^{K} M_{ij} \|X_j - A((\overline{Y}+bP)_i)\|^2 - \lambda \sum_{i=1}^{N}\sum_{j=1}^{K} M_{ij} + T\sum_{i=1}^{N}\sum_{j=1}^{K} M_{ij}\log M_{ij}$$

where M is the match matrix $(K+1)\times(N+1)$ (having the outlier information stored in its last row and last column) are determined (240). In other words, the affine transformation and shape parameters of the active shape model are determined to minimize an energy function of a distance between a transformed and deformed model of the object (e.g., $Y'=A(\overline{Y}+bP)$) and the feature points. This is accomplished by using, for example, the method outlined below in FIG. 3.

As shown in FIG. 3, an initial temperature $T_0$ and a final temperature $T_f$ are set and a temperature T is set to be equal to the initial temperature $T_0$ (305). The affine transformation and shape parameters are then initialized (310), for example, by setting $$A = \begin{pmatrix} 1 & 0 \\ 0 & 1 \end{pmatrix}, \begin{pmatrix} 0 \\ 0 \end{pmatrix} b = 0,$$

where a transformed shape is $Y'=A(Y)=A(\overline{Y}+bP)$ and A is the affine transformation defined by the coefficients (a,b,c,d,e,f):

$$\begin{pmatrix} x_{Y'} \\ y_{Y'} \end{pmatrix} = \begin{pmatrix} a & b \\ d & e \end{pmatrix}\begin{pmatrix} x_Y \\ y_Y \end{pmatrix} + \begin{pmatrix} c \\ f \end{pmatrix}.$$

Then a robust point matching algorithm is performed until the temperature T is less than the final temperature $T_f$ (315). The robust point matching algorithm may include the following steps.

First, a transformed model of the active shape model is calculated (320) using, $Y'=A(\overline{Y}+bP)$ and a match matrix $M_{ij}$ is computed (325), where $$M_{ij} = \exp\left(-\frac{\|X_j - Y'_i\|^2 - \lambda}{T}\right).$$

A double normalization of the match matrix is then performed (330) such that:

$$\sum_{i=1}^{K+1} M_{ij} = 1 \text{ and } \sum_{j=1}^{N+1} M_{ij} = 1$$

and estimated data is generated (335). This is done because as Y has K dimensions and X has N dimensions they cannot be directly compared to each other. Thus, the affine transformation cannot be found using least squares. Here the match matrix is applied to the X dataset to bring it back to K dimensions. This enables Y and X' to be directly compared to each other and aligned with the affine transformation. Exemplary, estimated data is shown below:

$$M_i = \sum_{j=1}^{N} M_{ij}$$

$$X'_i = \begin{cases} \sum_{j=1}^{N} M_{ij} X_j & \text{if } M_i > 0.01 \\ 0 & \text{otherwise} \end{cases}$$

$$w_i = \begin{cases} 1 & \text{if } M_i > 0.01 \\ 0 & \text{otherwise} \end{cases}$$

Upon generating the estimated data, the affine transformation or the affine transformation and shape parameters are solved (340). For example, when the temperature T is greater than or equal to a temperature $T_1$ at which the system starts recovering shape parameters, the affine transformation is solved using the following equation, $$\min \sum_{i=1}^{K} \|X'_i - A(\overline{Y}_i)\|^2.$$

By using least squares, this equation can be completed by solving the two linear systems as shown below, $$\begin{pmatrix} \sum wx_Y^2 & \sum wx_Y y_Y & \sum wx_Y \\ \sum wx_Y y_Y & \sum wy_Y^2 & \sum wy_Y \\ \sum wx_Y & \sum wy_Y & \sum w \end{pmatrix} \begin{pmatrix} a \\ b \\ c \end{pmatrix} = \begin{pmatrix} \sum wx_Y x_X \\ \sum wy_Y x_X \\ \sum wx_X \end{pmatrix}$$

-continued $$\begin{pmatrix} \sum wx_Y^2 & \sum wx_Yy_Y & \sum wx_Y \\ \sum wx_Yy_Y & \sum wy_Y^2 & \sum wy_Y \\ \sum wx_Y & \sum wy_Y & \sum w \end{pmatrix} \begin{pmatrix} d \\ e \\ f \end{pmatrix} = \begin{pmatrix} \sum wx_Yy_X \\ \sum wy_Yy_X \\ \sum wy_X \end{pmatrix}.$$

When the temperature T is less than $T_1$, the affine transformation and shape parameters are solved by: 1) initializing the shape parameters such that b=0; 2) defining a new shape, for example, $Y=\bar{Y}+bP$; 3) solving for the affine transformation using $$\min \sum_{i=1}^{K} \|X_i' - A(Y_i)\|^2;$$

4) applying the inverse affine transformation to the data by using $$\tilde{X}_i = A^{-1}(X_i');$$

5) recomputing the shape parameters $b=b+P(\tilde{X}-Y)$; and 6) repeating (2) for a fixed number of iterations or until b does not change anymore.

Once the affine transformation or the affine transformation and shape parameters are solved, the temperature T is decreased (345) using for example, $T=T\alpha$ where α is a number less than 1, and if the temperature T is greater than a final temperature $T_f$, the method goes to step 320 and steps 320-345 are repeated, otherwise the method proceeds to step 355 and ends. At this point, a representation of the object of interest may be output for analysis by a medical practitioner.

Figure 4:
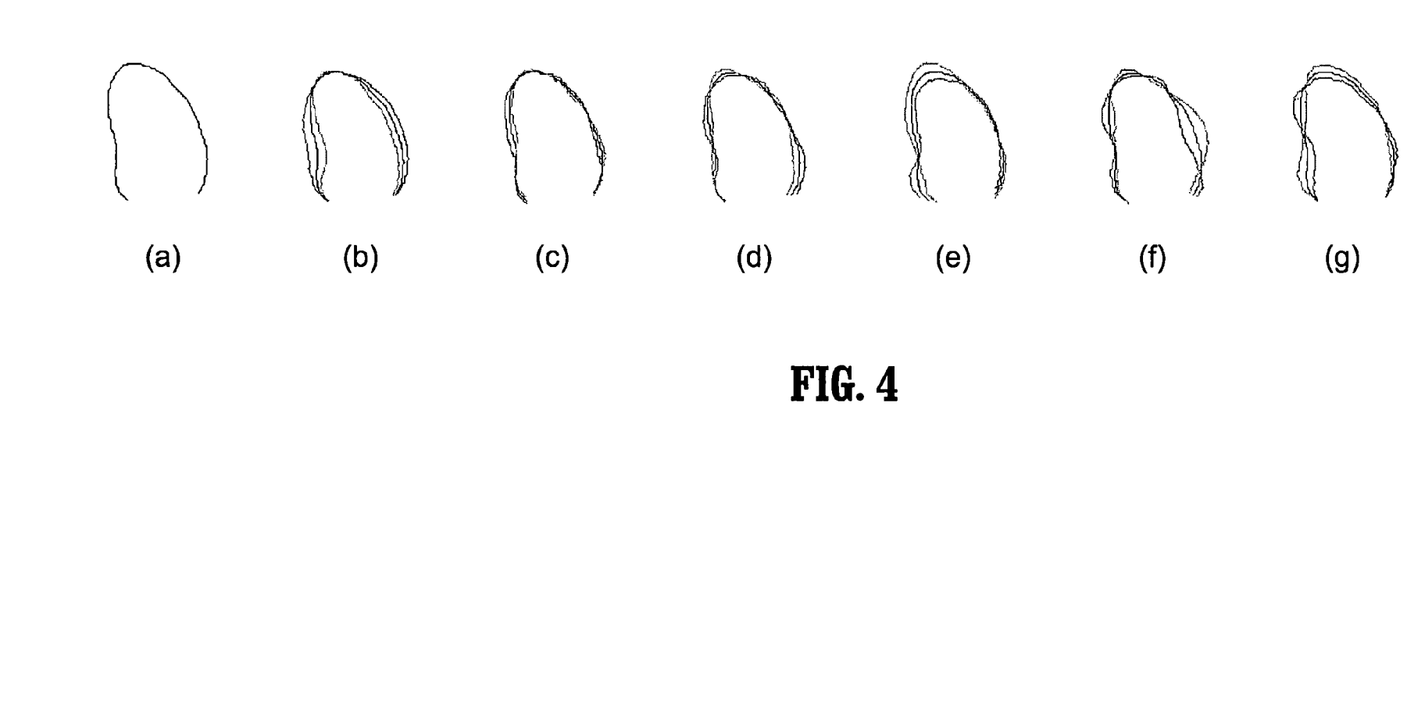
FIG. 4 is a series of images illustrating an active shape model of endocardiums for use with an exemplary embodiment of the present invention.

To assess the method according to an exemplary embodiment of the present invention, the method was tested on 4-chamber view echocardiography images acquired with an Acuson Sequoia 256 Scanner. Examples of the endocardial borders as captured using an active shape model from 33 patients are illustrated in FIG. 4, where the left image (a) is the mean shape and images (b-g) are shape changes encoded by the first six modes of variation. The following FIGS. 5-7 will show examples of where the model was transformed and deformed to align to feature points in new images according to an exemplary embodiment of the present invention.

Figure 5:
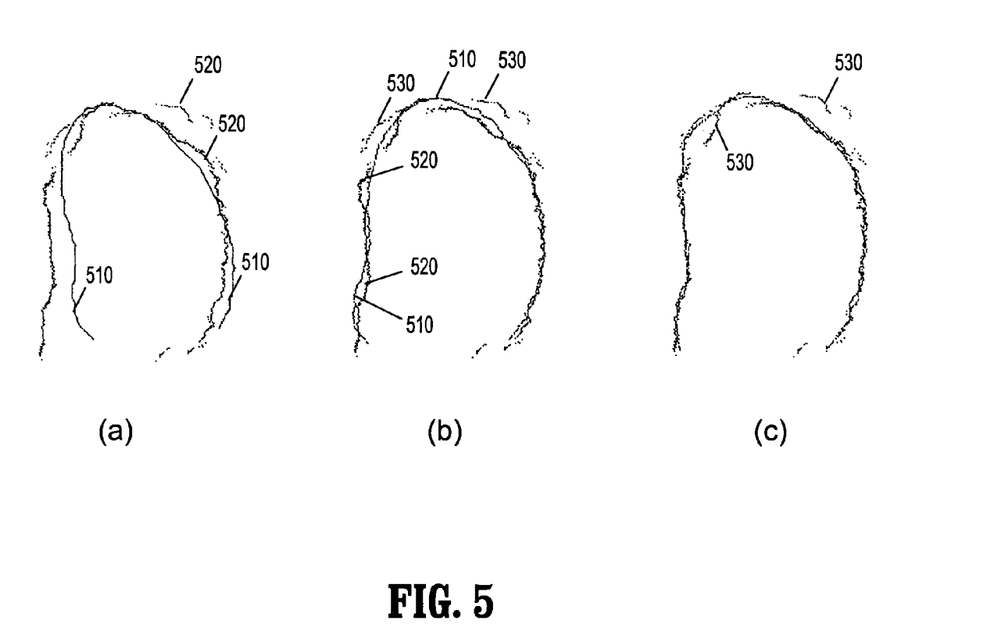
FIG. 5 is a series of images illustrating a method for extracting an object of interest from an image according to an exemplary embodiment of the present invention.

FIG. 5 is a series of images (a-c) illustrating the left ventricle of the heart as observed in a 4-chamber apical view using an ultrasound device. As shown in FIG. 5, image (a) illustrates the starting point of the method according to an exemplary embodiment of the present invention where a set of points of the active model is indicated by the more solid contour like line 510 and the data is indicated by individual feature points 520. Image (b) illustrates the iteration before local deformations are introduced with exterior pixels 530 corresponding to outlier points of the data. Image (c) illustrates the results of step 240.

Figure 6:
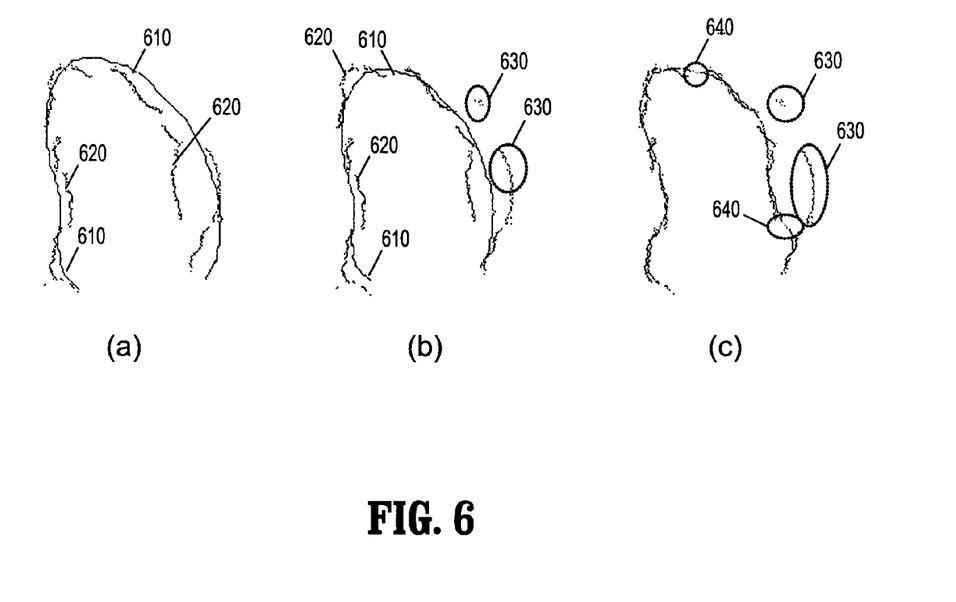
FIG. 6 is another series of images illustrating a method for extracting an object of interest from an image according to an exemplary embodiment of the present invention.

FIG. 6 is another series of images (a-c) illustrating the left ventricle of the heart as observed in a 4-chamber apical view using an ultrasound device. As shown in FIG. 6, image (a) illustrates the starting point of the method according to an exemplary embodiment of the present invention where a set of points of the active model is indicated by the more solid contour like line 610 and the data is indicated by the individual feature points 620. Image (b) illustrates the iteration before local deformations are introduced with exterior lines 630 corresponding to outlier points of the data. Image (c) illustrates the results of step 240 with points 640 corresponding to model points that were rejected as outliers.

Figure 7:
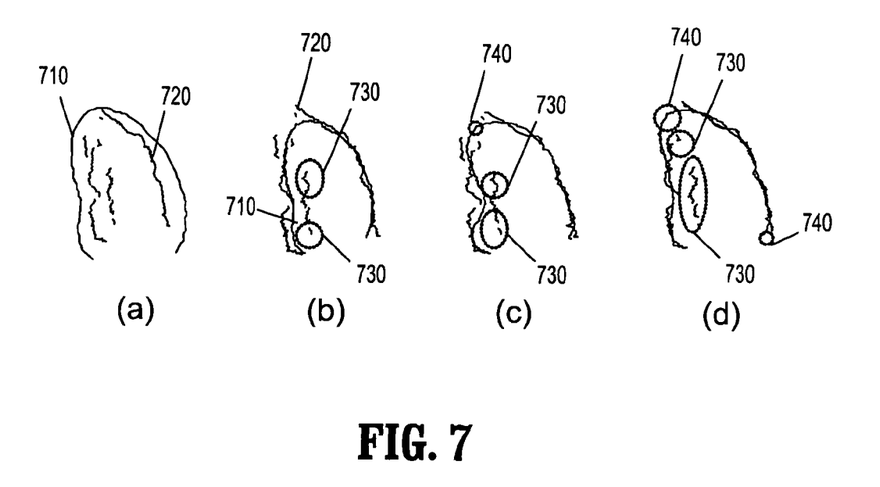
FIG. 7 is yet another series of images illustrating a method for extracting an object of interest from an image according to an exemplary embodiment of the present invention.

FIG. 7 is yet another series of images (a-d) of the left ventricle of the heart as observed in a 4-chamber apical view using an ultrasound device. As shown in FIG. 7, image (a) illustrates the starting position of the method according to an exemplary embodiment of the present invention with active model points indicated by a smooth line 710 and feature points indicated by a set of individual points 720. Image (b) shows the model points 710 aligned with the feature points 720 by applying an affine transformation. Outlier points 730 indicating rejected model points are shown in the circular regions of image (b). Image (c) corresponds to the recovery of the object as local deformations are introduced. Circle 740 of image (c) indicates that part of the model starting to be rejected. Image (d) corresponds to the final alignment of local deformations through the shape parameters of the active shape model. As shown by the circles 740 in images (c) and (d), an entire piece of the model was rejected because no corresponding feature points were found.

To assess the effect of model point density on the performance of a method according to an exemplary embodiment of the present invention, four models with different sizes (e.g., 100, 200, 300 and 400 points) were generated by sub-sampling an active shape model. For each experiment, the maximum size of the feature point set was determined before the method broke down. In other words, the recovered solution was grossly wrong as the model collapsed to only a few feature points and most of the feature points became outliers.

Figure 8:
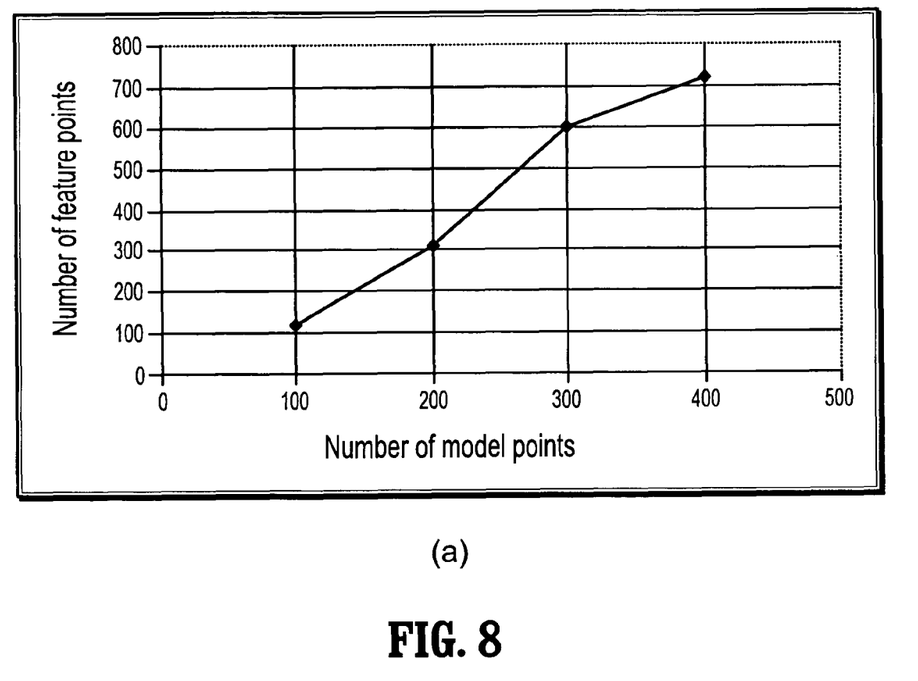
FIG. 8 is a graph illustrating the robustness of a method for extracting an object of interest from an image according to an exemplary embodiment of the present invention in view of real data.

In the first experiment, 10 different sets of patient data for each model were used and the number of tolerated feature points was averaged. FIG. 8 shows the maximum number of tolerated feature points for different model sizes. As shown in FIG. 8, as the size of the model grew, the corresponding tolerance to noise or outlier feature points increased. For example, with a model size of 300 points, the method according to an exemplary embodiment of the present invention tolerated 50% of feature outliers.

In the second experiment, synthetic tests with models of different sizes were used. An image was generated by applying an affine transformation to the average model and then removing some of the model points in the image to simulate model outliers. Gaussian noise with standard deviation of 1 to simulate localized noise, 30 and 100 to simulate spread feature outliers were added. For each case, the maximum size for the feature point set over 10 images was averaged. Two examples of this are shown in FIG. 9.

Figure 9:
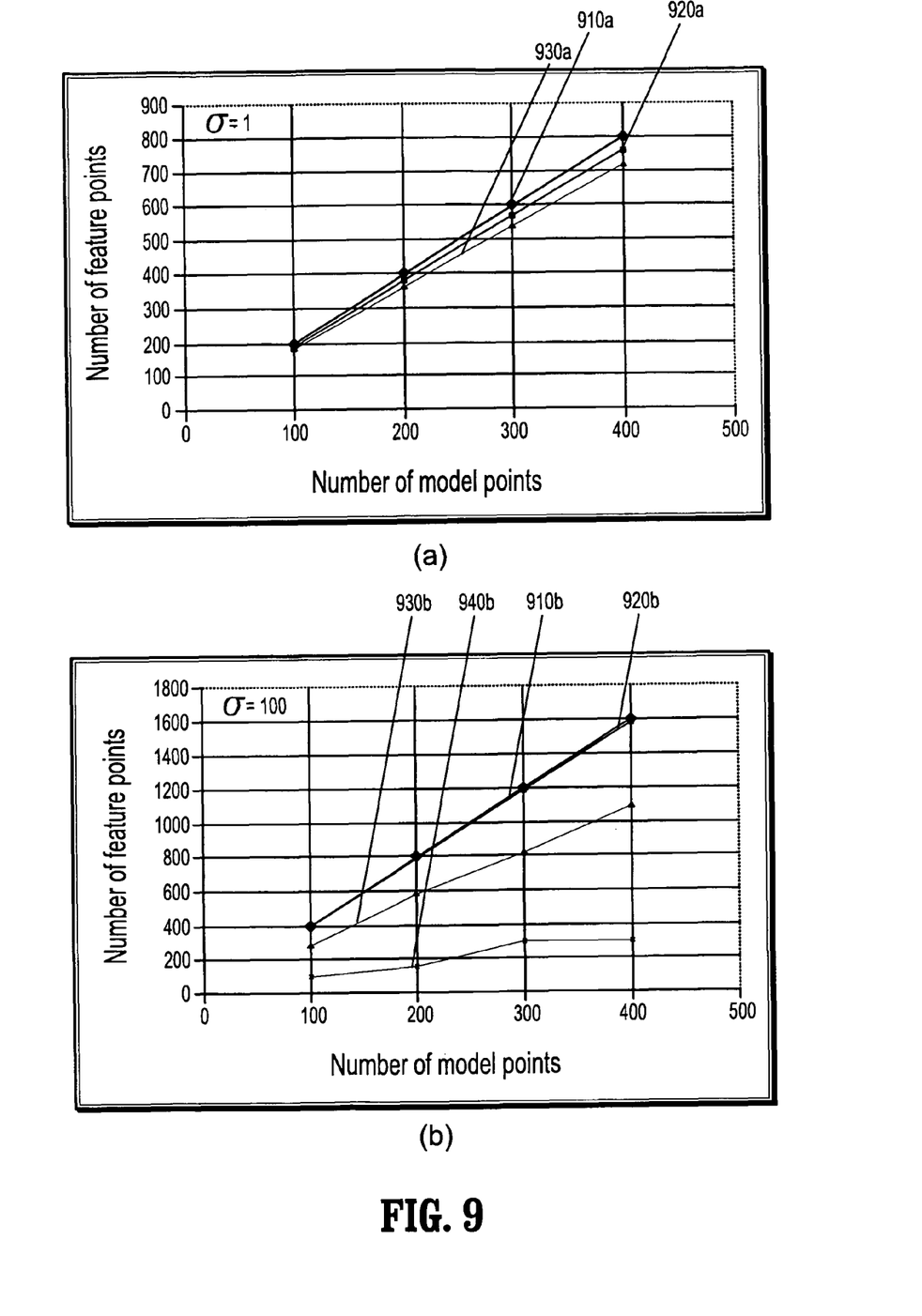
FIG. 9 is a pair of graphs illustrating the robustness of a method for extracting an object of interest from an image according to an exemplary embodiment of the present invention in view of synthetic data.

As shown in FIG. 9, it is evident that with a small amount of noise variance, even if some of the model points in the image were removed, the robustness of the method according to an exemplary embodiment of the present invention was not affected. For example, lines 916a,b indicate that approximately 0% of model points or model outliers were removed, lines 920a,b indicate that approximately 10% of model points or model outliers were removed, lines 930a,b indicate that approximately 20% of model points or model outliers were removed and line 940b indicates that approximately 50% of model points or model outliers were removed.

In accordance with an exemplary embodiment of the present invention, an active shape model is embedded in a robust point matching algorithm so that shapes of arbitrary sizes from two sets of points can be matched by rejecting points as outliers from both sets. The result is that the method is more robust than a classic active shape model. For example, instead of making a local decision on which pixel should be a feature point, the method identifies many feature points and utilizes robust point matching to determine which feature points to keep and which to reject based on the shape of the object of interest. As such, the method is more flexible than classic robust point matching because it allows some constrained local deformations to be located on the object of interest.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for extracting an object of interest from an image, comprising:
   generating an active shape model of a physical object, wherein the active shape model includes model points;
   acquiring an image of the object, wherein the image includes feature points of the object and image outliers, the image outliers being feature points that are not part of the object;
   extracting the feature points from the image;
   determining an affine transformation and shape parameters of the active shape model to minimize an energy function of a distance between a transformed and deformed model of the object and the feature points, wherein the energy function matches the model points and the feature points to each other, rejects model points for which there are no matching feature points present in the image as model outliers and rejects the image outliers; and
   producing a representation of the object as a result of determining an affine transformation and shape parameters of the active shape model, wherein the representation does not include the rejected model and image outliers.

2. The method of claim 1, wherein the feature points are manually extracted.

3. The method of claim 1, wherein the feature points are automatically extracted.

4. The method of claim 1, wherein determining an affine transformation and shape parameters of the active shape model comprises:
   determining an initial temperature and a final temperature, which are deterministic annealing parameters;
   setting a first temperature to the initial temperature;
   initializing the affine transformation and shape parameters; and
   executing a robust point matching algorithm until the first temperature is less than the final temperature.

5. The method of claim 4, wherein executing a robust point matching algorithm comprises:
   determining a transformed model of the active shape model;
   determining a match matrix;
   performing a double normalization of the match matrix;
   generating estimated data to map the feature points the active shape model and the transformed active shape model;
   solving the affine transformation if the first temperature is greater than the initial temperature or the affine transformation and the shape parameters if the first temperature is less than the initial temperature; and
   decreasing the first temperature.

6. The method of claim 1, wherein the image is acquired using one of a magnetic resonance (MR), computed tomography (CT), positron emission tomography (PET), a two-dimensional (2D) or three-dimensional (3D) fluoroscopic, a 2D, 3D, or four-dimensional (4D) ultrasound, or x-ray imaging technique.

7. A system for extracting an object of interest from an image, comprising:
   a memory device for storing a program;
   a processor in communication with the memory device, the processor operative with the program to:
   generate an active shape model of an object, wherein the active shape model includes model points;
   acquire an image of the object, wherein the image includes feature points of the object and image outliers, the image outliers being feature points that are not part of the object;
   extract the feature points from the image; and
   determine an affine transformation and shape parameters of the active shape model to minimize an energy function of a distance between a transformed and deformed model of the object and the feature points, wherein the energy function matches the model points and the feature points to each other, rejects model points for which there are no matching feature points present in the image as model outliers and rejects the image outliers.

8. The system of claim 7, wherein the extraction of feature points is performed in response to a manual input.

9. The system of claim 7, wherein the extraction of feature points is performed automatically.

10. The system of claim 7, wherein when determining an affine transformation and shape parameters of the active shape model the processor is further operative with the program to:
   determine an initial temperature and a final temperature;
   set a first temperature to the initial temperature;

initialize the affine transformation and shape parameters; and execute a robust point matching algorithm until the first temperature is less than the final temperature.

11. The system of claim 10, wherein when executing a robust point matching algorithm the processor is further operative with the program to:

determine a transformed model of the active shape model;

determine a match matrix;

perform a double normalization of the match matrix;

generate estimated data to map the feature points to the active shape model and the transformed active shape model;

solve the affine transformation if the first temperature is greater than the initial temperature or the affine transformation and the shape parameters if the first temperature is less than the initial temperature; and decrease the first temperature.

12. The system of claim 7, wherein the image is acquired using one of a magnetic resonance (MR), computed tomography (CT), positron emission tomography (PET), a two-dimensional (2D) or three-dimensional (3D) fluoroscopic, a 2D, 3D, or four-dimensional (4D) ultrasound, or x-ray imaging device.

13. A method for extracting an object of interest from an image using a robust active shape model, comprising:

generating an active shape model of a physical object, wherein the active shape model includes model points;

acquiring an image of the object, wherein the image includes feature points of the object and image outliers, the image outliers being feature points that are not part of the object;

extracting the feature points from the image;

embedding the active shape model in a robust point matching algorithm to form a robust active shape model;

determining an affine transformation and shape parameters of the active shape model to minimize an energy function of a distance between a transformed and deformed model of the object and the feature points by iterating the robust active shape model until a first temperature is smaller than a final temperature, wherein the energy function matches the model points and the feature points to each other, rejects model points for which there are no matching feature points present in the image as model outliers and rejects the image outliers; and producing a representation of the object as a result of determining an affine transformation and shape parameters of the active shape model, wherein the representation does not include the rejected model and image outliers.

14. The method of claim 13, wherein the active shape model includes an average contour model and modes of variations.

15. The method of claim 13, wherein the feature points are manually extracted.

16. The method of claim 13, wherein the feature points are automatically extracted.

17. The method of claim 13, wherein the image is acquired using one of a magnetic resonance (MR), computed tomography (CT), positron emission tomography (PET), a two-dimensional (2D) or three-dimensional (3D) fluoroscopic, a 2D, 3D, or four-dimensional (4D) ultrasound, or x-ray imaging technique.

18. The method of claim 13, wherein determining an affine transformation and shape parameters of the active shape model comprises:

determining an initial temperature and a final temperature, which are deterministic annealing parameters;

setting a first temperature to the initial temperature; and initializing the affine transformation and shape parameters.

19. The method of claim 18, wherein iterating the robust active shape model comprises:

determining a transformed model of the active shape model;

determining a match matrix;

performing a double normalization of the match matrix;

generating estimated data to map the feature points to the active shape model and the transformed active shape model;

solving the affine transformation if the first temperature is greater than the initial temperature or the affine transformation and the shape parameters if the first temperature is less than the initial temperature; and decreasing the first temperature.

20. The method of claim 13, further comprising:

outputting the representation of the object.

* * * * *